United States Patent [19]

Labaw et al.

[11] 4,213,199

[45] Jul. 15, 1980

[54] ACOUSTIC DATA LINK

[75] Inventors: Kenneth B. Labaw, Ridgecrest, Calif.; Gary Lowe, Prague, Okla.; Myren L. Iverson, Ridgecrest, Calif.

[73] Assignee: The United States of America as represented by the Secretary of the Navy, Washington, D.C.

[21] Appl. No.: 944,118

[22] Filed: Sep. 20, 1978

[51] Int. Cl.² ............................................. H04B 11/00
[52] U.S. Cl. ..................................... 367/117; 367/134
[58] Field of Search .................... 340/15, 5 R, 18 NC, 340/18 FM, 18 CM, 850, 851, 566; 179/1 VE; 367/81, 117, 134

[56] References Cited

U.S. PATENT DOCUMENTS

| | | | |
|---|---|---|---|
| 2,172,066 | 9/1939 | Logsdon | 179/1 VE |
| 3,611,332 | 10/1971 | Slater | 340/5 R |
| 3,930,220 | 12/1975 | Shawhan | 340/18 NC |

Primary Examiner—Theodore M. Blum
Attorney, Agent, or Firm—R. S. Sciascia; W. Thom Skeer; Kenneth G. Pritchard

[57] ABSTRACT

An acoustic data link using the I-beam frame of a structure. The use of steel or aluminum framing permits a structure such as a ship to suffer damage in one section without loss of communication between sections. A universal asynchronous receive and transmit circuit converts data to be sent into a binary code which is inputted to the frame by a transducer. At a different location, a similar transducer receives the signal which is then converted back into an electrical signal.

1 Claim, 4 Drawing Figures

ACOUSTIC DATA LINK

BACKGROUND OF THE INVENTION

1. Field of the Invention

This invention relates to communication systems for individual structures, such as ships and buildings. Specifically it relates to systems that transmit via acoustic waves within the metal frame of a ship or building.

2. Description of the Prior Art

Current communication systems in ships and buildings rely on electrical wiring. Such wiring requires conduits and cable trays requiring space. Repairing and modifying such cables are difficult, costly and time consuming. For ships, damage to wiring runs the risk of loss of ability to coordinate damage control.

Fiber optics provides a high information bandwidth. However, fiber optics still require conduits which take up space Like wiring, a single break in a fiber optic line prevents communication. Alternate routes for both fiber optics and wiring provide backup reliability, but increase both the space required and the cost of the communication link.

SUMMARY OF THE INVENTION

The present invention uses the metal frame work of a structure, such as I-beams, to transmit acoustic signals. The signals are free to travel along any possible path formed by the frame. Thus, damage to one portion of a structure can not disrupt communication between the receiver and transmitter.

The transmitter consists of a signal source which inputs parallel loaded digitized signals to a universal asynchronous receive and transmit, UART circuit. The UART performs parallel to serial conversion binary coding, serial bits of logical 1 and 0's, of the input signals. The UART's serial output is frequency shift keyed by a voltage controlled oscillator. This signal is amplified before driving a transducer which in turn is clamped or cemented to the metal frame of the structure.

The transducer inputs the physical vibrations to the metal frame, and the vibrations travel throughout the frame at the speed of sound in the frame. A second transducer mounted on the frame receives the signal and converts it back to an electrical signal. This received signal is amplified and filtered. It is then converted by a phase lock loop chip to a serial binary output which is then decoded by a second UART. The decoded signal is then displayed by any well known device desired.

Alternate forms of coding can be used. Examples include pseudo-noise or double side band supressed carrier techniques.

DESCRIPTION OF THE PREFERRED EMBODIMENT

Figure 1:
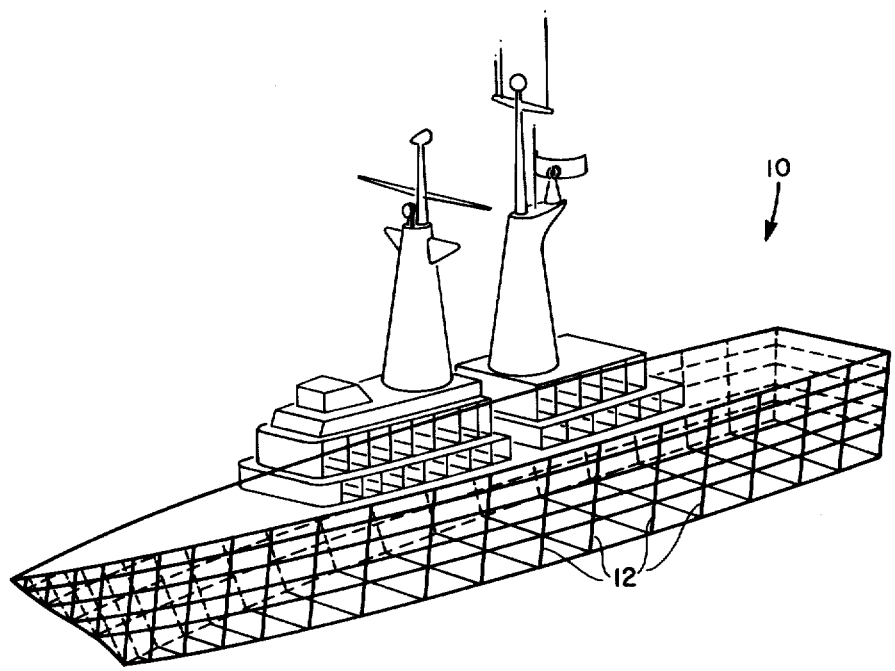
FIG. 1 is an outline of the frame of a ship.

FIG. 1 shows the structural outline of a ship 10. The metal frame 12 consists of either steel or aluminum I-beams. These beams provide a maze of signal paths for acoustic signals to travel. As long as any path exists between any two points on frame 12, signals can be sent between those two points.

Figure 2:
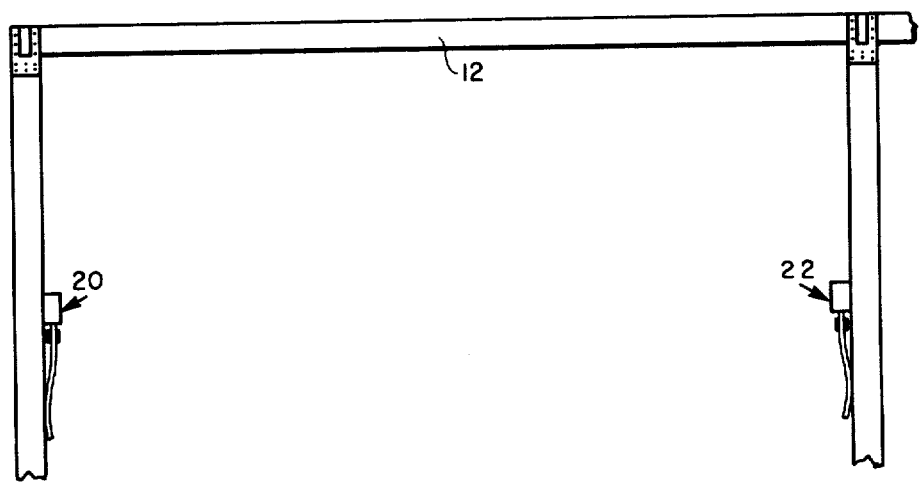
FIG. 2 shows the frame of a structure with the present invention mounted on it.

FIG. 2 shows a transmitter 20 and a receiver 22 connected to two different members of frame 12 which are connected by one or more beams. Signals are able to travel along any traceable path of beams shown in FIG. 1. This results in multiple path interference at receiver 22. This problem is minimized by tuning the transmitter and receiver once they are in place on frame 12.

Figure 3:
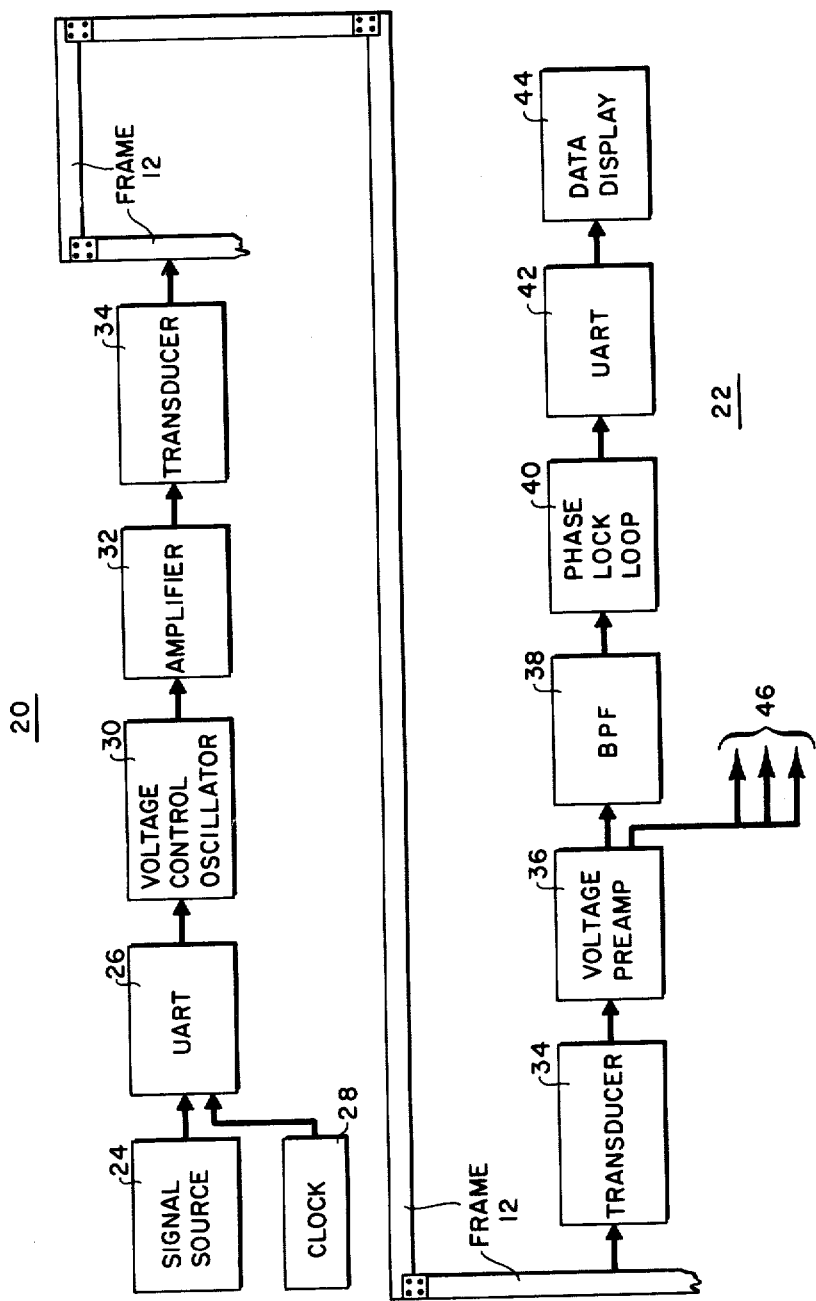
FIG. 3 is a block diagram of the embodiment of the present invention.

FIG. 3 shows a block diagram of transmitter 20 and receiver 22. Transmitter 20 consists of an initial signal generating means which serves as a signal source 24 such as an output of an analog to digital converter connected to a fire alarm or other signal source which provides a variety of input signals to a universal asynchronous receive and transmit, UART, chip 26. The term "chip" is used in place of the phrase integrated circuit. Signal source 24 permits a variety of signals representative of predetermined events to be initiated. These signals can represent the nature of a problem, such as fire, flooding or the like, or they can represent various self monitoring conditions of signal source 24, such as charge remaining in the battery.

UART chip 26 also receives an input from a clock 28. This input serves as a timing signal permitting the UART to perform its coding function of digital signal to binary code. UART 26 is a parallel to serial converter in reciver 20. UARTs are available commercially, an example is General Instruments AY-5-101BA. The output from UART 26 is fed into a voltage controlled oscillator 30 which is used as a frequency shift keying modulator. Phase lock loops such as XR-210 or XR-215 by EXAR Integrated Systems or CD4046A by RCA are readily available commercially for use as phase shift keying modulator/demodulators.

Voltage controlled oscillator 30 converts the serial binary logic output from UART 26 to frequency shifts representing this logic 1 or 0 condition. For example, the voltage output of UART 26 will be either zero (0) or five (5) volts. Two frequencies, $F_1$ and $F_2$ are emitted depending on UART 26 voltage output. An amplifier 32 insures that the proper predetermined level of signal is inputted to the transducer 34 which is mounted on frame 12. Transducer 34 is mounted by either being clamped or cemented to frame 12.

Figure 4:
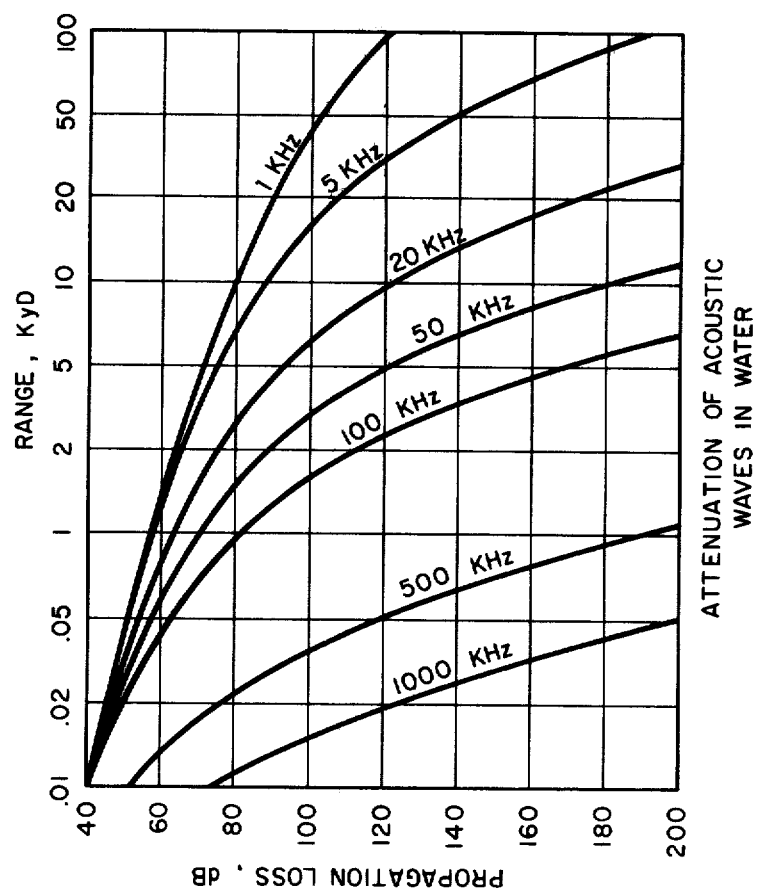
FIG. 4 shows the propagation characteristic of acoustic waves in water.

Transmitter 20 has been used with frequencies ranging between 100 KHz to 1 MHz. For most applications, a range of 100 KHz to 200 KHz has provided the best results in a steel frame building. The upper frequency is a tradeoff between attenuation at high frequencies and increased background noise at low frequencies. The lower limit is because of the propagation characteristics of attenuation in water shown in FIG. 4. The rapid loss of signal over 100 KHz insures that ships will not acquire an acoustic signature that can be used to detect or identify them.

Receiver 22 in FIG. 3 uses a second transducer 34 mounted on frame 12 to receive the acoustic signal. A voltage preamp 36 is impedance matched to the transducer to provide a usable electrical output. A band pass filter 38 is connected to preamp 36. Band pass filter 38 rejects out of band noise to provide a high signal to noise ratio. The filtered output is then fed to a phase lock loop 40 which is wired to function as a frequency shift keying discriminator. Phase lock loop 40 outputs a serial binary signal for decoding by UART 42. The decoded signal is displayed on data display 44. UART 42 serves as a serial to parallel converter in receiver 22. Multiple channels can be used by feeding the output of preamp 36 to other bandpass filters as shown by arrows 46. Each filter would be set to a different frequency range that matched a specific transmitter. Data display 44 can be an array of warning lights.

What is claimed is:

1. An acoustic data communication link for a frame ship comprising:

a plurality of signal generators located at predetermined sites through said ship for generating predetermined signals characteristic of each site upon the ocurrence of a predetermined event at any of said sites;

a psuedo-noise modulator connected to each signal generator for encoding said predetermined signals;

an emitting piezoelectric crystal transducer connected between each modulator and said frame for inputting said coded signals as physical vibrations in said frame;

a receiving piezoelectric crystal transducer at a predetermined location on said frame for receiving said physical vibrations and converting them back into said coded signals;

a bandpass filter connected to said receiving transducer for eliminating background noise not in the desired frequency range of said coded signal;

a pseudo-noise demodulator connected to said band pass filter for decoding said filtered reconverted coded signal; and means for displaying said identified source connected to said demodulator.

* * * * *